United States Patent [19]

Hiyoshi et al.

[11] 4,350,622
[45] Sep. 21, 1982

[54] AQUEOUS DISPERSIONS OF VINYLIDENE CHLORIDE RESINS

[75] Inventors: Kazuhiko Hiyoshi; Norio Matsuura; Michiharu Matsugichi, all of Nobeoka; Norio Onofusa; Tadao Nishikage, both of Yokohama, all of Japan

[73] Assignee: Asahi-Dow Limited, Tokyo, Japan

[21] Appl. No.: 291,728

[22] Filed: Aug. 10, 1981

[51] Int. Cl.$^3$ .............................................. C08L 35/04
[52] U.S. Cl. .................................. 524/831; 526/317; 524/833
[58] Field of Search ................ 260/29.6 TA; 526/317

[56] References Cited

U.S. PATENT DOCUMENTS

| | | | |
|---|---|---|---|
| 3,041,208 | 6/1962 | Hay et al. | 117/138.8 |
| 3,058,939 | 10/1962 | Meier | 260/29.6 |
| 3,108,017 | 10/1963 | Messwarb et al. | 117/138.8 |
| 3,449,302 | 6/1969 | Nachbur et al. | 260/79.3 |
| 3,696,082 | 10/1972 | Smith | 260/80.8 |
| 3,736,303 | 5/1973 | Smith et al. | 260/79.3 M |
| 3,879,359 | 4/1975 | Hinkamp et al. | 260/80.81 |
| 3,946,139 | 3/1976 | Bleyle et al. | 428/518 |

*Primary Examiner*—Joseph L. Schofer
*Assistant Examiner*—Bernard Lipman
*Attorney, Agent, or Firm*—D. R. Howard

[57] ABSTRACT

An aqueous dispersion of a vinylidene chloride copolymer resin which, when coated onto a synthetic resinous film substrate, has the combined properties of: (1) good adhesion to the substrate; (2) good adhesion of a printing ink to the coating; (3) excellent barrier to gases (especially oxygen) and water vapor; and (4) a high resistance to a boiling water treatment. The dispersion must contain methacrylic acid in an amount of from about $1 \times 10^{-4}$ to about $3 \times 10^{-4}$ moles per gram of polymer solids content. The dispersion must also have a molar ratio of acrylonitrile to methyl methacrylate of from about 0 to 1 to about 1 to 1. A limited portion of the amount of methacrylic acid is contained in the aqueous phase. The remaining amount of methacrylic acid is polymerized with the vinylidene chloride.

2 Claims, No Drawings

AQUEOUS DISPERSIONS OF VINYLIDENE CHLORIDE RESINS

DETAILED DESCRIPTION OF THE INVENTION

The present invention relates generally to an aqueous dispersion of a vinylidene chloride resin. More particularly, the present invention relates to such an aqueous dispersion which has good adhesion properties and which is capable of forming a coating having a good printability, excellent gas (especially oxygen) and water vapor barrier properties and excellent resistance to boiling water treatment.

Eating habits and food handling and distribution practices have become increasingly diversified. Food packaging laminates which are obtained by applying a coating of an aqueous dispersion of a vinylidene chloride resin, directly or through the medium of one or more anchor coats, onto a plastic film formed from other polymer resins such as polypropylene, polyester, nylon or the like, have come to gain a remarkably wide acceptance recently.

Topmost functional requisites to such vinylidene chloride resin coatings for food packaging applications are barrier properties to gas and water vapor. To prevent dampening, drying, flavor deterioration or decomposition of packaged foods, food packaging materials must have high gas and water vapor barrier properties. Among currently available food packaging materials, polyol resin films are widely accepted with respect to gas barrier properties. Polyolefin resin films are widely accepted with respect to water vapor barrier properties. However, food packaging materials having excellence in both water vapor barrier properties and gas barrier properties are very limited. Accordingly, aqueous dispersions of vinylidene chloride resins have come to be widely utilized for the manufacture of food packaging materials. It is now expected and required that such aqueous vinylidene chloride resin dispersions impart increasingly higher gas and water barrier properties to food packaging materials. Such aqueous vinylidene chloride resin dispersions must also have good adhesiveness to surfaces onto which they are to be applied. In addition, said dispersions must have an excellence in overall workability that facilitates application onto such surfaces. Further, such dispersions must be capable of forming coats that are suitable for securing good adhesion of printing ink thereto (hereinafter referred to as printability).

An aqueous dispersion of a vinylidene chloride resin may be obtained by emulsion-copolymerizing vinylidene chloride with a minor amount of one or more monomers copolymerizable therewith in water in the presence of an emulsifying agent, polymerization initiator and, as required, an electrolyte for conditioning the aqueous dispersion of for the like purposes. Non-reacted residual monomers are then removed. If necessary, a suitable amount of a surfactant may be added to improve the time-dependent colloid stability of the resultant aqueous dispersion. To improve adhesiveness and printability which are, as described previously, important properties of aqueous dispersions or coatings formed therefrom for food packaging applications, minor amounts of one or more unsaturated carboxylic acids copolymerizable with vinylidene chloride and with the foregoing minor amount of one or more monomers copolymerizable with vinylidene chloride may be added to a polymerization feedstock and polymerized together with the vinylidene chloride and the copolymerizable monomers. Illustrative copolymerizable unsaturated carboxylic acids are acrylic acid, methacrylic acid and itaconic acid.

Many foods or like products are now stored or sold as hermetically packed in vinylidene chloride resin-coated film bags. Some foods may require sterilization through boiling water after being hermetically packed. A coated film for such an application must have a high boiling water resistance. In other words, such coated films must undergo neither clarity loss nor reduction in gas barrier properties as a result of boiling water treatment. In this regard, however, addition of the aforementioned unsaturated carboxylic acids to improve the adhesive properties of aqueous vinylidene chloride resin dispersions tends to reduce the boiling water resistance of coatings desposited from such dispersions of films coated with such dispersions.

To obtain an aqueous vinylidene chloride resin dispersion which satisfies these rather conflicting requirements, namely, excellent adhesive properties and boiling water resistance of its coating or coated films, the inventors in Japanese Patent Application No. 54-159,406, filed Dec. 7, 1979, and U.S. patent application Ser. No. 270,060, filed June 3, 1981, proposed using one or more selected unsaturated carboxylic acids, and formulating and processing the feedstock so that the quantity of such unsaturated carboyxlic acid or acids existing in the water phase of the resultant aqueous vinylidene chloride resin dispersion falls in a specific range. This proposal was successful in improving fairly the barrier properites of coated films while maintaining the aforementioned adhesive properties and printability at acceptable or higher levels. However, as the market demands increasingly higher quality of food packaging materials, the gas and water vapor barrier properties achieved by the aforementioned proposal will become unsatisfactory sooner or later. In such a situation, an invention which provides a vinylidene chloride resin composition capable of forming, while maintaining such adhesiveness and printability at acceptable or higher levels, coatings satisfying the following parameters as measured by methods to be described herein later will be highly valuable for the industry:

For a coating weight of 5 grams per square meter ($g/m^2$) and regardless of what material is used as the substrate:

| | |
|---|---|
| Water vapor permeability | 5 $g/m^2$ or less in 24 hours |
| Oxygen permeability after boiling water treatment | 10 cubic centimeters per square meter ($cc/m^2$) or less in 24 hours; preferably 8 $cc/m^2$ or less in 24 hours |

The inventors have found out that an aqueous dispersion of a vinylidene chloride resin obtained by emulsion-polymerizing a mixture of vinylidene chloride, as a major component, and minor amounts of one or more other monomers and one or more unsaturated carboxylic acids copolymerizable therewith can have good adhesiveness. In addition, such dispersions can form a coating having a good printability and excellent gas and water vapor barrier properties as well as excellent resistance to boiling water treatment. Such properties are obtained only when the aforesaid copolymerizable monomers and unsaturated carboxylic acids are selected from specific combinations thereof which per se are known, provided that the unsaturated carboxylic acid units are distributed between the polymer solids phase and water phase of the aqueous vinylidene chloride resin dispersion at a partition coefficient within a specific range. That is, the quantity of the unsaturated carboxylic acid units existing in the water phase including the quantity of unsaturated carboxylic acid units existing in the vicinity of its boundary with the polymer solids phase must fall within a specific range.

Accordingly, the present invention provides that an aqueous dispersion of a vinylidene chloride resin is obtained by emulsion-polymerizing a mixture of vinylidene chloride as a major component, methacrylic acid, methyl methacrylate and, optionally, acrylonitrile; said aqueous dispersion containing (a) from about 87 to about 93 mole percent, based on polymer solids content, vinylidene chloride units; (b) from about 13 to about 7 mole percent, based on polymer solids content, of a mixture of acrylonitrile and methyl methacrylate, said mixture having a molar ratio of acrylonitrile to methyl methacrylate of from about 0 to 1 to about 1 to 1; (c) from about $1 \times 10^{-4}$ to about $3 \times 10^{-4}$ moles of methacrylic acid units per gram of said polymer solids content, with the further limitation that the content of methacrylic acid existing in a form titratable with a 1/20 N aqueous solution of soldium hydroxide does not exceed either about $1.3 \times 10^{-4}$ moles per gram of polymer solids content or about 50 percent of the total methacrylic acid content, whichever is smaller.

As described immediately above, it is required that the aqueous vinylidene chloride resin dispersion of the present invention contain from about 87 to about 93 mole percent vinylidene chloride units based on polymer solids content. If the vinylidene chloride units content is smaller than 87 mole percent on said basis, a coating resulting therefrom will show reduced gas and water vapor barrier properties. If the vinylidene chloride units content exceeds 93 mole percent on said basis, the aqueous dispersion will have a tendency to coagulate in a shorter time after preparation and difficulty will arise in obtaining continuous clear films therefrom.

Also as described above, in order to secure good adhesion to substrates such as base films and anchor coats and in order to form a coating having a good printability, it is required that the aqueous vinylidene chloride resin dispersion of the present invention contain at least about $1 \times 10^{-4}$ moles, in total, of methacrylic acid units per gram of polymer solids content. A total methacrylic acid units content of about $3 \times 10^{-4}$ moles per gram of polymer solids content is sufficient for achieving such a good adhesiveness and printability.

Aqueous vinylidene chloride resin dispersions can form a coating having desirably improved gas and water barrier properties and boiling water resistance, only when, as mentioned previously, the methacrylic acid units are distributed between the polymer solids phase and water phase of the aqueous dispersion at a partition coeffiecient within a specific range. To determine such a distribution of methacrylic acid units in the aqueous vinylidene chloride resin dispersion, the aqueous dispersion may be titrated directly with a 1/20 N aqueous solution of sodium hydroxide in a manner to be described herein later. The titration will be responded to only by those methacrylic acid units existing in the water phase and by those methacrylic acid units which exist in the vincinity of its boundary with the polymer solids phase. The titration will not be responded to by those methacrylic acid units which are taken in the dispersed polymer particles. To secure satisfactory boiling water resistance of a coating deposited from the aqueous dispersion in accordance with the present invention, it is required that the content of methacrylic acid units existing in the water phase and titratable with a 1/20 N solution of sodium hydroxide must not exceed either about $1.3 \times 10^{-4}$ moles per gram of polymer solids content or about 50 percent of the total methacrylic acid content, whichever is smaller.

Further, the aqueous vinylidene chloride resin dispersion of the present invention, must have a molar ratio of acrylonitrile to methyl methacrylate in a range from about 0 to 1 to about 1 to 1. Surprisingly, the gas barrier properties of the resultant coating are at a peak (gas permeability showing its minimum) at a molar ratio of acrylonitrile to methyl methacrylate intermediate between about 0 to 1 and about 1 to 1. Thus, it is preferable to use, as far as possible, such a molar ratio where the aforesaid peak is achieved. The gas and water vapor barrier properties of the resultant coating decrease as the acrylonitrile content increases past that peak. If the molar ratio of acrylonitrile to methyl methacrylate exceeds about 1, the resultant coating no longer has acceptable gas and water vapor barrier properties.

The present invention may employ, as required, any of the known emulsifying agents, polymerization initiators, surfactants and like additives for preparing the aqueous dispersion of vinylidene chloride resin. However, such additives will remain in the coating formed therefrom and will result in reduced gas and water barrier properties as well as reduced boiling water resistance. Thus, it is desired to limit the use of such additives to their minimum quantities by, for example, subjecting the aqueous dispersion to dialysis after emulsion polymerization.

In the meantime, the combination of vinylidene chloride, methacrylic acid and methyl methacrylate and, as desired, acrylonitrile is well-known in the art of aqueous vinylidene chloride copolymer resin dispersions. Many examples of aqueous vinylidene chloride resin dispersions employing such a combination can be cited including U.S. Pat. Nos. 3,879,359 and 3,108,017, provided that the unsaturated carboxylic acid is not limited to methacrylic acid.

U.S. Pat. No. 3,879,359 is directed to a coating obtained by dissolving a vinylidene chloride resin in an organic solvent. As to the aforesaid molar ratio of acrylonitrile and methyl methacrylate, U.S. Pat. No. 3,879,359 describes a vinylidene chloride resin coating formulation in which the acrylonitrile content surpasses the methyl methacrylate content. The present invention, on the other hand, requires that the molar ratio of acrylonitrile to methacrylate must not exceed about 1 to 1.

Hereafter, the present invention will be further illustrated by the following examples and the accompanying reference (comparative) experiments. The effects of the present invention were evaluated in terms of the properties and parameters to be described hereinbelow. All parts and percentages used herein are given on a weight basis unless otherwise specified.

(A) Chlorine Content

The vinylidene chloride content in terms of it constitutional units on a polymer solids basis in an aqueous dispersion of a vinylidene chloride resin was determined by measuring the chlorine content of the solids in the aqueous dispersion. A sample amount of the aqueous dispersion of the vinylidene chloride resin was dissolved in warm methanol under agitation to break its colloidal state. A precipitate resulted which was then separated by filtration, washed and dried to be used as a test sample. To determine chlorine content of the sample, a portion of the sample was subjected to an analysis substantially in accordance with Schöniger's oxygen flask combustion method set forth in JIS K 6722.

(B) Nitrogen Content

The acrylonitrile unit content on a polymer solids basis in an aqueous dispersion of a vinylidene chloride resin was determined by measuring the nitrogen content of the aqueous dispersion. A part of the same sample prepared for use in the chlorine content analysis of the preceding paragraph (A) was analyzed by micro Kjeldahl method.

(C) Solid Content

A sample of an aqueous dispersion of a vinylidene chloride resin was accurately weighed on an accurately weighed aluminum foil pan in an amount close to 1 g. The sample was left to dry in a circulating hot air dryer at 120° Centigrade (°C.) for 30 minutes. Sample weight loss was then measured to determine the solid content of an aqueous dispersion.

(D) Carboxyl Group Content

The carboxyl group content in an aqueous dispersion of a vinylidene chloride resin was determined by conductometric titration using a conductometric analyzer, Model E365B (Metrohm). Samples were prepared and titrated in the following manner:

Titration A: Carboxyl group content in aqueous dispersion

A sample of the aqueous dispersion of the vinylidene chloride resin was dissolved in 100 g of dimethylformamide in an accurately weighed amount close to 1 g. The resultant solution was titrated with a 1/10 Normal (N) dimethylformamide solution of cobalt acetate.

Titration B: Determination of carboxyl group content titratable with NaOH solution A sample of the aqueous dispersion of the vinylidene chloride resin in an accurately weighed amount close to 2 g was diluted with 110 milliliters of deionized water. The diluted aqueous dispersion was titrated with a 1/20 N aqueous solution of sodium hydroxide.

(E) Preparation of Coated Film

An oriented polypropylene film or polyester film subjected to corona discharge treatment was coated with a primer (equivalent to an anchoring agent) (EL220 produced by Toyo Ink Mfg. Co., Ltd.) at a coating weight of about 0.2 g/m$^2$, followed by drying. Then an aqueous dispersion of a vinylidene chloride resin was coated onto the dried primer coated film at a coating weight of about 5 g/m$^2$ by using a Mayer rod. The resultant coating was dried in a circulating hot air dryer at 100° C. for 30 seconds.

(F) Adhesiveness to Substrate

An adhesive tape (Cellotape 12 millimeters wide, produced by Nichiban Co., Ltd.) was stuck onto a coated film immediately after it was prepared in the manner as described in the preceding paragraph (E). Then, the adhesive tape was rapidly torn off. As a result of this tearing, a coated film having its coating torn off by the tape was evaluated as unacceptable, and a coated film hving a coating which could withstand the stripping was evaluated as acceptable.

(G) Applied Printing Ink Adhesiveness

A coated film prepared in the manner as described in paragraph (E) above was left to stand in a thermostatic oven at 60° C. for 24 hours after preparation. Then, it was coated with white GNC ink (produced by Toyo Ink Mfg. Co., Ltd.) by means of a Mayer rod. After 30 seconds of drying at 60° C., an adhesive tape (Cellotape produced by Nichiban Co., Ltd.) was stuck onto the ink coating. Then, the adhesive tape was rapidly torn off. An area where the ink remained without being torn off by the tape was visually determined and shown in Table 1 in terms of percentage of the total area of the ink coating.

(H) Oxygen Permeability

An oriented polypropylene film, 22 microns thick, coated in the manner described in Paragraph (E) above with a coating weight of 5 g/m$^2$ was left to stand for 2 days in an atmosphere at room temperature and at a relative humidity of 100% or treated in boiling water (see paragraph J). After the aforesaid 2 days had elapsed, or immediately after the boiling, the oxygen permeability of the coated film was measured with an oxygen permeability tester, OX-TRAN 100 (Modern Control) at 20° C. and relative humidity of 100%.

(I) Water Vapor Permeability

An oriented polyester film 12 microns thick was coated in the manner described in paragraph (E) above with a coating weight of about 5 g/m$^2$. The water vapor permeability of the coated film was measured in accordance with JIS Z 0208. Since this measurement according to JIS Z 0208 is done in such a high temperature-humidity atmosphere (40° C. and relative humidity of 90%), the water vapor permeability can be regarded as meaning nothing but a measure to show the water resistance of the coating, so far as such a sample as an aqueous dispersion coating that is highly susceptible to moisture is concerned.

(J) Boiling Water Treatment

A coated film wrapped in a gauze was immersed for 30 minutes in water boiling at a temperature in the range or from about 95° C. to 100° C. After being taken out of the boiling water, the coated film was put between filter paper sheets to absorb water drips deposited on its surface.

(K) Molecular Weight

A portion of the sample prepared in paragraph (A) above was analyzed by a high-speed liquid chromatograph HLC-802UR (manufactured by Toyo Soda Manufacturing Co., Ltd.) by using tetrahydrofuran as a carried solvent.

EXAMPLE 1

1.98 Parts of methacrylic acid was added to 100 parts of a mixture consisting of 92.14 parts of vinylidene chloride and 7.86 parts of methyl methacrylate to obtain a monomer mixture. An aqueous solution consisting of 90 parts of deionized water, 0.08 parts of sodium dodecylbenzenesulfonate and 0.05 parts of sodium persulfate was added to a 200 liter glass-lined stirred pressure reactor. 10 Percent of the monomer mixture was then added to the aqueous solution. The reactor was purged with gaseous nitrogen ($N_2$), kept under an $N_2$ blanket and sealed. 0.45 Parts of sodium persulfate were added to a sufficient amount of deionized water to form a dilute aqueous solution of sodium persulfate containing about 10 percent sodium persulfate based on weight of the aqueous solution. The dilute aqueous solution of sodium persulfate was added to the reactor under agitation at a generally constant rate for 18 hours while keeping reactor contents at a temperature of 55° C. The dilute aqueous solution of sodium persulfate was added with a small metering pump. The generally constant rate was such that 0.028 parts of sodium persulfate were added per hour.

When the 10 percent of the monomer mixture had been almost completely polymerized as monitored through a change in the internal pressure of the reactor of 0.2 kilograms per square centimeter, a 20 percent aqueous solution containing about 0.65 parts of sodium lauryl sulfate is deionized water was charged into the reactor. Succeedingly, the whole of the remaining monomer mixture (90% of the monomer mixture prepared initially) was continuously added to the reactor at such a rate that the addition was completed over a period of about 15 hours. It is to be noted here that in the course of adding the remaining monomer mixture, that the aqueous solution of sodium persulfate was also added continuously at the rate of 0.28 parts of sodium persulfate per hour and that addition of the sodium persulfate solution was stopped when monomer addition was stopped. After the monomer addition was stopped, the contents of the reactor were maintained at a temperature of about 55° C. for an additional period to further the reaction until the internal pressure reached a sufficiently low level negative pressure to obtain an intended aqueous dispersion.

After the internal pressure had reached the sufficiently low level, a sufficient amount of a 20 percent aqueous solution of sodium lauryl sulfate was added to the aqueous dispersion to adjust its surface tension to 42 dynes/cm at 20° C. Steam was then blown through the aqueous dispersion at a rate of 4 percent an hour, based on the aqueous dispersion, while maintaining a reduced internal pressure of −500 to −600 millimeters of mercury to keep the aqueous dispersion at 60° C. This treatment removed unreacted residual monomers to such an extent that the aqueous dispersion contained not more than 10 ppm of unreacted residual vinylidene chloride. Thereafter, the thus treated aqueous dispersion was dialyzed against pure water through a cellulosic semipermeable membrane so as to minimize dialyzable hydrophilic substances contained therein. The dialysis was continued until the specific electric conductivity of the aqueous dispersion was below $2.5 \times 10^{-3} \Omega cm^{-1}$ as measured using a commercial conductometer.

The formulations and compositions of the charged materials and the results of tests on the resultant aqueous dispersion are summarized in Table 2 together with similar data for succeeding examples and reference (comparative examples). Table 2 follows the last reference.

EXAMPLE 2

Instead of the monomer mixture of Example 1, a mixture prepared by adding 2 parts of methacrylic acid to 100 parts of a mixture consisting of 93 parts of vinylidene chloride, 5.95 parts of methyl methacrylate and 1.05 parts of acrylonitrile was used. That is to say, acrylonitrile and methyl methacrylate were used at a molar ratio of 1:3. Except for the monomer mixture formulation, the same procedure and conditions as those of Example 1 were repeated.

EXAMPLE 3

Instead of the monomer mixture of Example 1, a mixture prepared by adding 2.02 parts of methacrylic acid to 100 parts of a mixture consisting of 93.87 parts of vinylidene chloride, 4 parts of methyl methacrylic and 2.13 parts of acylonitrile was used. That is to say, acrylonitrile and methyl methacrylate were used as a molar ratio of 1:1. Except for the monomer mixture formulation, the same procedure and conditions as those of Example 1 were repeated.

Reference 1

Instead of the monomer mixture of Example 1, a mixture prepared by adding 2.04 parts of methacrylic acid to 100 parts of a mixture consisting of 94.77 parts of vinylidene chloride, 2.02 parts of methyl methacrylate and 3.21 parts of acrylonitrile was used. That is to say, acrylonitrile and methyl methacrylate were used at a molar ratio of 3:1. Except for the monomer mixture formulation, the same procedure and conditions as those of Example 1 were repeated.

Reference 2

Instead of the monomer mixture of Example 1, a mixture prepared by adding 2.06 parts of methacrylic acid to 100 parts of a mixture consisting of 95.67 parts of vinylidene chloride and 4.33 parts of acrylonitrile was used. Except for the formulation of the monomer mixture the same procedure and conditions as those of Example 1 were repeated.

In the foregoing Examples 1 through 3 and References 1 and 2, their monomer mixtures all contain almost the same levels of vinylidene chloride and methacrylic acid, namely, about 90.35 mol % and 2.19 mol %, respectively. The remaining 7.46 mol % was shared by acrylonitrile and methyl methacrylate at molar ratios of 0:1, 1:3, 1:1, 3:1 and 1:0, respectively, in the order of examples and references cited. As shown in Table 2, the water vapor permeability increases as the acrylonitrile content increases. Oxygen permeability was minimized at an acrylonitrile-methyl methacrylate molar ratio of 1:3 both in the boiled and non-boiled coated films. That is to say, it was shown that if the requirements of the present invention for acrylonitrile and methyl methacrylate contents are not met, the resultant aqueous dispersion cannot produce coatings having a highly improved performance even when the requirements for methacrylic acid content are met.

The following References 3 and 4 are presented to show that will occur if the requirements of the present invention for methacrylic acid content are not met when the requirements for acrylonitrile and methyl methacrylate contents are met.

Reference 3

Instead of the monomer mixture of Example 1, a mixture prepared by adding 0.5 part of methacrylic acid to 100 parts of a mixture consisting of 92 parts of vinylidene chloride, 6.8 parts of methyl methacrylate and 1.2 parts of acrylonitrile was used. Except for the monomer mixture formulation, the same procedure and conditions as those of Example 1 were repeated.

As shown in Table 2, with such a low methacrylic acid content, the resultant aqueous dispersion cannot form a coating having a sufficient printing ink adhesiveness. Also, the resultant coating will undergo a remarkable opacification when boiled. For any food packaging materials having vinylidene chloride resin coatings for which transparency is one of utmost requirements, such opacification very much reduces their commercial value.

Reference 4

Instead of the monomer mixture of Example 1, a mixture prepared by adding 4 parts of methacrylic acid to 100 parts of a mixture consisting of 94.87 parts of vinylidene chloride, 4.36 parts of methyl methacrylate and 0.77 part of acrylonitrile was used. Except for the monomer mixture formulation, the same procedure and conditions as those of Example 1 were repeated.

As shown in Table 2, if the methacrylic acid content exceeds its upper limit according to the present invention, the resultant aqueous dispersion cannot form a coating having a sufficient resistance to a boiling water treatment.

The following References 6 and 7 are presented to show that use of the same stock materials as those used in the preferred examples does not necessarily produce coatings having a highly improved performance. That is a mere combination of raw materials does not always give such an improved performance. Only a very limited technique or process which makes the best use of the properties of such raw materials can produce an aqueous dispersion meeting the performance requirements intended by the present invention.

Reference 5

In this experiment, a typical batch emulsion polymerization process was used. That is, all of the stock materials used in Example 2 were initially charged into the reactor, and held therein at 55° C. under agitation to promote polymerization until the internal pressure reached a sufficiently low level. An aqueous dispersion was obtained. For the succeeding steps, the same procedure and conditions as those used in Example 1 were repeated.

Reference 6

In this reference, a seed polymerization process, also generally used for emulsion polymerization was used. Instead of adding an aqueous solution of sodium persulfate as the polymerization initiator continuously over a prolonged period as in Example 2, the sodium persulfate content of the aqueous solution precharged in the reactor was increased to 0.1 part. 10 Percent of the resultant monomer mixture was first subjected to polymerization to produce a seed latex. Then, after adding thereto 0.65 part of sodium lauryl sulfate, the remaining 90 percent of the monomer mixture was added in toto instead of adding it over a prolonged period as in Example 2. For the succeeding steps, the same procedure and conditions as those of Example 2 were repeated.

In the foregoing References 5 and 6, the methacrylic acid content titratable with a 1/20 N aqueous solution of sodium hydroxide exceeded the upper limit specified by the present invention. As shown in Table 2, the resultant aqueous dispersions could not form coatings having a very high boiling water resistance as intended by the present invention.

Apart from such a distribution mode of methacrylic acid, the aqueous dispersions of References 5 and 6 can be easily distinguished from that of Example 2 in terms of molecular weight of their resins as well. That is, the vinylidene chloride resins obtained by adding the entire monomer mixture at a time (References 5 and 6) had molecular weights larger than twice the molecular weight of the vinylidene chloride resin obtained by adding a part of the monomer mixture over a prolonged period (Example 2), as shown in Table 1, which follows:

TABLE 1

| | Molecular Weight Comparison | |
|---|---|---|
| | Weight Average Molecular Weight | Number Average Molecular Weight |
| Example 2 | 37,000 | 17,600 |
| Reference 5 | 97,000 | 43,000 |
| Reference 6 | 88,900 | 36,100 |

The following References 7 through 10 are presented to show what will occur if monomers other than those specified by the present invention are used in the preparation of monomer mixtures.

Reference 7

In this reference, itaconic acid was used instead of methacrylic acid as in Example 1. That is, a monomer mixture was prepared by adding 0.76 part of itaconic acid to 100 parts of a mixture consisting of 92 parts of vinylidene chloride, 6.8 parts of methyl methacrylate and 1.2 parts of acrylonitrile. Except for the monomer mixture formulation, the same procedure and conditions as those of Example 1 were repeated.

Reference 8

In this reference, acrylic acid was used instead of methacrylic acid as in Example 1. That is to say, a monomer mixture was prepared by adding 1.67 parts of acrylic acid to 100 parts of a mixture consisting of 93 parts of vinylidene chloride, 5.95 parts of methyl methacrylate and 1.05 parts of acrylonitrile. Except for the monomer mixture formulation, the same procedure and conditions as those of Example 1 were repeated.

The following References 9 and 10 are presented to show effects of variations of constituent monomers other than unsaturated carboxylic acids. For this purpose, methyl methacrylate, which was used in Example 1, was replaced by methyl acrylate, a monomer commonly used for preparing aqueous dispersions of vinylidene chloride resins.

Reference 9

Except that a monomer mixture was prepared by adding 2 parts of methacrylic acid to 100 parts of a mixture consisting of 93.16 parts of vinylidene chloride and 6.84 parts of methyl acrylate, the same procedure and conditions as those of Example 1 were repeated.

Reference 10

Except that a monomer mixture was prepared by adding 2 parts of methacrylic acid to 100 parts of a mixture consisting of 92.95 parts of vinylidene chloride, 4.95 parts of methyl acrylate and 2.1 parts of acrylonitrile, the same procedure and conditions as those of Example 1 were repeated.

In either of the foregoing References 9 and 10, the resultant aqueous dispersions did not have such an improved performance as that of the aqueous dispersions according to the present invention, as shown in Table 1. This also shows a significant effectiveness of the formulation according to the present invention.

acrylonitrile; said aqueous dispersion containing: (a) from about 87 to about 93 mole percent, based on polymer solids content, vinylidene chloride units; (b) from about 13 to about 7 mole percent, based on polymer solids content, of a mixture of acrylonitrile and methyl methacrylate, said mixture having a molar ratio of acrylonitrile to methyl methacrylate of from about 0 to 1 to about 1 to 1; (c) from about $1 \times 10^{-4}$ to about $3 \times 10^{-4}$ moles of methacrylic acid units per gram of said polymer solids content, with the further limitation that the content of methacrylic acid existing in a form titratable with a 1/20 N aqueous solution of sodium hydroxide does not exceed either about $1.3 \times 10^{-4}$ moles per gram of polymer solids content or about 50 percent of the

TABLE 2
Formulations and Test Results

| Examples & References | Type of Unsaturated Carboxylic Acid | Other* Monomers (Molar Ratio) | | Chlorine Content (%) | Nitrogen Content (%) | Carboxyl Group Content ($\times 10^{-4}$ mol per 1 Gram of Solid Content) | | |
|---|---|---|---|---|---|---|---|---|
| | | | | | | Titration A | Titration B | B/A (%) |
| Example 1 | Methacrylic Acid | MMA | — | 66.3 | — | 1.8 | 0.7 | 39 |
| Example 2 | Methacrylic Acid | AN/MMA | 1/3 | 67.1 | 0.25 | 1.5 | 0.6 | 40 |
| Example 3 | Methacrylic Acid | AN/MMA | 1/1 | 67.8 | 0.52 | 1.4 | 0.65 | 46 |
| Reference 1 | Methacrylic Acid | AN/MMA | 3/1 | 68.2 | 0.78 | 1.8 | 0.7 | 39 |
| Reference 2 | Methacrylic Acid | AN | — | 68.9 | 1.06 | 1.6 | 0.8 | 50 |
| Reference 3 | Methacrylic Acid | AN/MMA | 1/3 | 66.9 | 0.29 | 0.5 | 0.3 | 60 |
| Reference 4 | Methacrylic Acid | AN/MMA | 1/3 | 67.3 | 0.18 | 3.4 | 1.4 | 41 |
| Reference 5 | Methacrylic Acid | AN/MMA | 1/3 | 67.0 | 0.25 | 1.7 | 1.0 | 59 |
| Reference 6 | Methacrylic Acid | AN/MMA | 1/3 | 66.9 | 0.24 | 1.7 | 0.9 | 53 |
| Reference 7 | Itaconic Acid | AN/MMA | 1/3 | 66.8 | 0.29 | 1.1 | 0.7 | 64 |
| Reference 8 | Acrylic Acid | AN/MMA | 1/3 | 66.9 | 0.25 | 2.2 | 1.4 | 64 |
| Reference 9 | Methacrylic Acid | MA | — | 67.2 | — | 1.6 | 0.7 | 44 |
| Reference 10 | Methacrylic Acid | AN/MMA | 1/3 | 67.0 | 0.51 | 1.6 | 0.7 | 44 |

| Examples & References | Adhesiveness To Substrate | Printing Ink Adhesiveness (%) | Water Vapor Permeability (g/m²/24 hr) | Oxygen Permeability (cc/m²/24 hr) | Oxygen Permeability After Boiling | Opacification By Boiling |
|---|---|---|---|---|---|---|
| Example 1 | Good | 70 ~ 80 | 4.1 | 3.1 | 7.9 | Good |
| Example 2 | Good | 100 | 4.2 | 2.7 | 6.0 | Good |
| Example 3 | Good | 100 | 4.9 | 2.9 | 8.2 | Good |
| Reference 1 | Good | 100 | 6.9 | 3.1 | >10 | No good |
| Reference 2 | Good | 100 | 8.6 | 3.8 | >10 | No good |
| Reference 3 | Good | 10 ~ 20 | 4.1 | 2.6 | 5.8 | No good |
| Reference 4 | Good | 100 | 5.2 | 4.5 | >10 | Good |
| Reference 5 | Good | 100 | 6.7 | 5.7 | >10 | No good |
| Reference 6 | Good | 100 | 5.1 | 6.3 | >10 | No good |
| Reference 7 | Good | 100 | 5.4 | 3.2 | >10 | Good |
| Reference 8 | Good | 100 | 4.5 | 2.7 | >10 | Good |
| Reference 9 | Good | 70 ~ 80 | 6.3 | 4.9 | >10 | Good |
| Reference 10 | Good | 70 ~ 80 | 7.8 | 3.6 | 9.5 | Good |

*AN = acrylonitrile; MMA = methyl methacrylate; MA = methyl acrylate

What is claimed is:

1. An aqueous dispersion of a vinylidene chloride copolymer resin obtained by emulsion polymerizing a mixture of vinylidene chloride as a major component, methacrylic acid, methyl methacrylate and, optionally, total methacrylic acid content, whichever is smaller.

2. The aqueous dispersion of claim 1 wherein the molar ratio of acrylonitrile to methyl methacrylate is about 1 to 3.

* * * * *

UNITED STATES PATENT AND TRADEMARK OFFICE
CERTIFICATE OF CORRECTION

PATENT NO. : 4,350,622

DATED : September 21, 1982

INVENTOR(S) : Kazuhiko Hiyoshi; Norio Matsuura; Michiharu Matsugichi; Norio Onofusa; and Tadao Nishikage It is certified that error appears in the above—identified patent and that said Letters Patent is hereby corrected as shown below:

Col. 1, line 10, "adhesion" should read -- adhesive --.

Col. 1, line 50, "printability." should read -- printability). --.

Col. 2, line 18, "desposited" should read -- deposited --.

Col. 2, line 18, "of" should read -- or --.

Col. 2, line 25, "and U.S." should read -- and in U.S. --.

Col. 2, line 33, "properites" should read -- properties --.

Col. 3, line 29, "soldium" should read -- sodium --.

Col. 3, line 61, "coeffiecient" should read -- coefficient --.

UNITED STATES PATENT AND TRADEMARK OFFICE
CERTIFICATE OF CORRECTION

PATENT NO. : 4,350,622
DATED : September 21, 1982
INVENTOR(S) : Kazuhiko Hiyoshi; Norio Matsuura; Michiharu Matsugichi; Norio Onofusa; and Tadao Nishikage It is certified that error appears in the above—identified patent and that said Letters Patent is hereby corrected as shown below:

Col. 4, line 1, "vincinity" should read -- vicinity --.

Col. 4, line 15, "range from" should read -- range of from --.

Col. 4, line 58, "Hereafter," should read -- Hereinafter,--.

Col. 5, line 29, "of an" should read -- of the --.

Col. 6, line 6, "hving" should read -- having --.

Col. 6, line 62, "carried" should read -- carrier --.

Col. 7, line 25, "is" should read -- in --.

Col. 7, line 66, "reference" should read -- references --.

Col. 8, line 18, "methacrylic" should read -- methacrylate --.

UNITED STATES PATENT AND TRADEMARK OFFICE
CERTIFICATE OF CORRECTION

PATENT NO. : 4,350,622

DATED : September 21, 1982

INVENTOR(S) : Kazuhiko Hiyoshi; Norio Matsuura; Michiharu Matsugichi; Norio Onofusa; and Tadao Nishikage It is certified that error appears in the above—identified patent and that said Letters Patent is hereby corrected as shown below:

Col. 8, line 19, "acylonitrile" should read -- acrylonitrile --.

Col. 11, Table 2, Reference 10, "AN/MMA" should read -- AN/MA --.

Signed and Sealed this

Twenty-eighth Day of December 1982

[SEAL]

Attest:

GERALD J. MOSSINGHOFF

Attesting Officer

Commissioner of Patents and Trademarks